(12) United States Patent
Allen et al.

(10) Patent No.: US 7,830,814 B1
(45) Date of Patent: Nov. 9, 2010

(54) PROVIDING INFORMATION ASSOCIATED WITH NETWORK LATENCY

(75) Inventors: Tim Allen, San Francisco, CA (US); Peter Santangeli, Los Gatos, CA (US)

(73) Assignee: Adobe Systems Incorporated, San Jose, CA (US)

( * ) Notice: Subject to any disclaimer, the term of this patent is extended or adjusted under 35 U.S.C. 154(b) by 1161 days.

(21) Appl. No.: 11/445,640

(22) Filed: Jun. 2, 2006

(51) Int. Cl.
  *H04L 1/00* (2006.01)
  *H04L 12/26* (2006.01)
  *H04L 12/16* (2006.01)
  *H04Q 11/00* (2006.01)

(52) U.S. Cl. .................. 370/252; 370/260; 370/261

(58) Field of Classification Search .......... 370/252, 370/260, 263, 264
  See application file for complete search history.

(56) References Cited

U.S. PATENT DOCUMENTS

| | | | |
|---|---|---|---|
| 6,560,648 B1 | 5/2003 | Dunn et al. | |
| 6,601,098 B1 | 7/2003 | Case et al. | |
| 6,662,223 B1 | 12/2003 | Zhang et al. | |
| 6,686,933 B1* | 2/2004 | Tang et al. | 715/751 |
| 7,061,871 B2* | 6/2006 | Sheldon et al. | 370/242 |
| 7,176,957 B2* | 2/2007 | Ivashin et al. | 348/14.09 |
| 2002/0131386 A1 | 9/2002 | Gwon | |
| 2003/0039216 A1* | 2/2003 | Sheldon et al. | 370/260 |
| 2005/0015444 A1* | 1/2005 | Rambo | 709/204 |
| 2005/0030905 A1* | 2/2005 | Luo et al. | 370/253 |
| 2005/0256829 A1* | 11/2005 | Yang et al. | 707/1 |
| 2006/0153089 A1 | 7/2006 | Silverman | |
| 2006/0176824 A1 | 8/2006 | Laver et al. | |
| 2006/0195520 A1* | 8/2006 | Stevens et al. | 709/204 |
| 2006/0256187 A1 | 11/2006 | Sheldon et al. | |
| 2006/0271624 A1* | 11/2006 | Lyle et al. | 709/204 |
| 2008/0063173 A1* | 3/2008 | Sarkar et al. | 379/202.01 |
| 2008/0267069 A1* | 10/2008 | Thielman et al. | 370/235 |
| 2009/0147737 A1* | 6/2009 | Tacconi et al. | 370/329 |
| 2009/0204922 A1* | 8/2009 | Bhattacharjee et al. | 715/771 |

* cited by examiner

*Primary Examiner*—Chi H Pham
*Assistant Examiner*—Farah Faroul
(74) *Attorney, Agent, or Firm*—Robert C Kowert; Meyertons, Hood, Kivlin, Kowert & Goetzel, P.C.

(57) ABSTRACT

Network conference application software measures communication latency between itself and an endpoint in a conference. Endpoints with excessive latency are identified as having a delay. Information about endpoints with delays is displayed by the network conference application during a network conference. The displayed information may include the ratio of endpoints with delays to total endpoints, and a representation of data previously transmitted by the conference application that an endpoint with a delay is currently viewing. A graphical user interface may be used for displaying information about endpoints with delays.

24 Claims, 10 Drawing Sheets

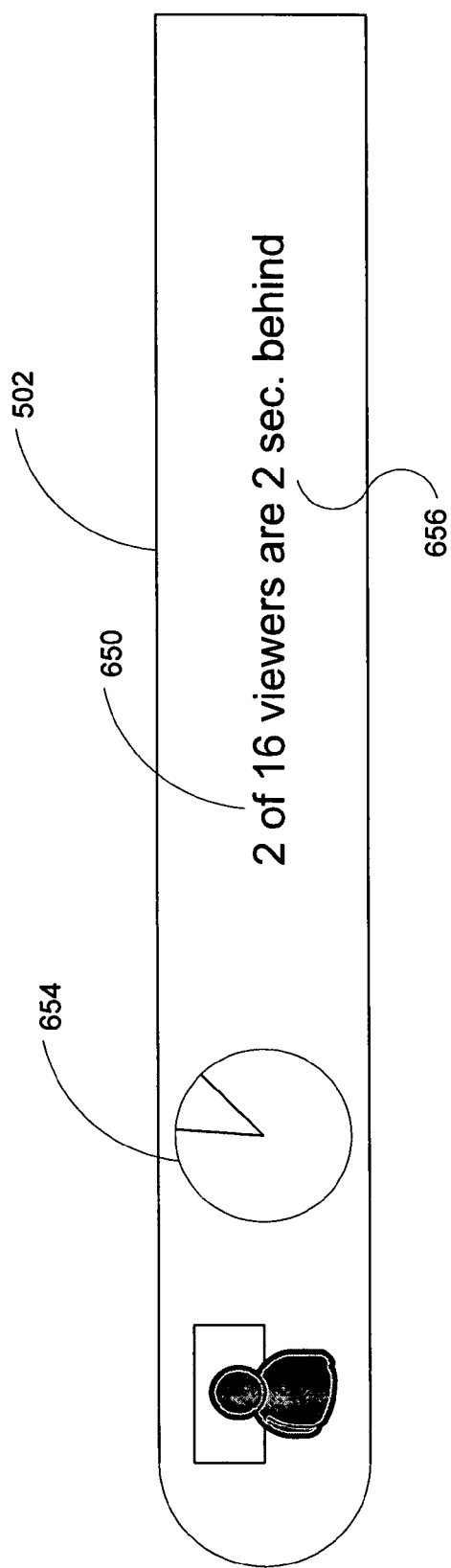

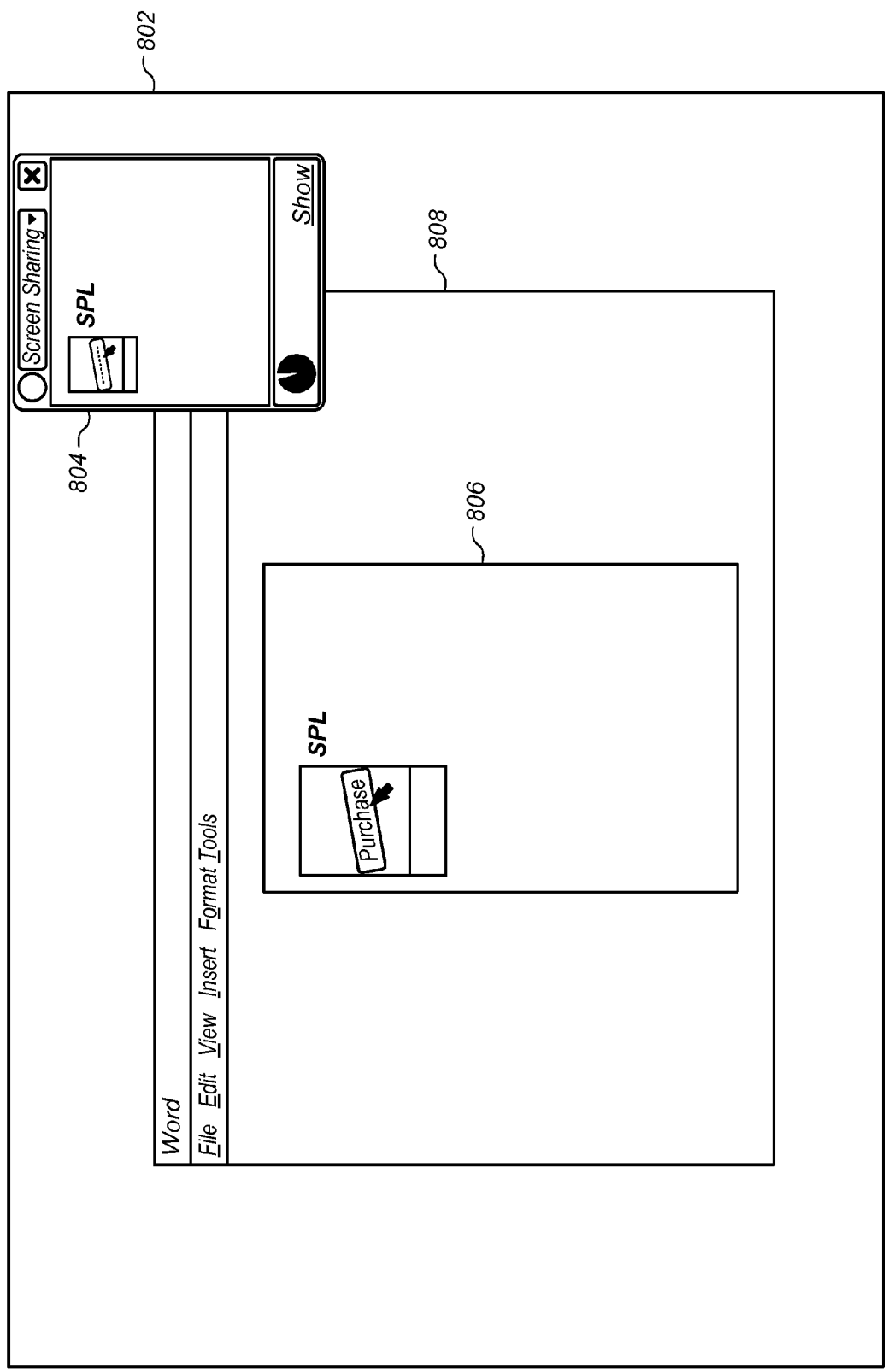

PROVIDING INFORMATION ASSOCIATED WITH NETWORK LATENCY

FIELD OF THE INVENTION

The present invention relates generally to software and, more particularly, to providing information associated with communication latency.

BACKGROUND

Network conferencing refers to interactive communication technologies that allow two or more locations to interact, for example, by way of real-time two-way video and audio transmissions. In a network conference, a participant may communicate and share data with other participants. For example, a participant may share texts, audio, images, and video in real time with other participants in the network conference.

All communications have communication latencies and if the communication latencies are significant, then data sharing in a network conference may not be in real-time. For example, significant communication latencies can cause a substantial disconnect between data displayed and seen by various participants in the network conference. In other words, the data viewed by various participants in the network conference may be different because of significant communication latencies.

Currently, if the network conference includes audio transmissions, participants in the network conference may verbally notify the participant sharing the data (e.g., a presenter) of the communication latency problem. If instant messaging is available in the network conference, a participant can type a message notifying the presenter of the communication latency problem. Such verbal and message notifications interrupt and distract the presenter and may also disrupt the presentation experience for other participants in the network conference.

In view of the foregoing, there is a need to further improve the notification of communication latencies in a network conference.

BRIEF DESCRIPTION OF THE DRAWINGS

Various embodiments of the invention are disclosed in the following detailed description and the accompanying drawings.

FIGS. 6A, 6B, and 6C are various embodiments of GUIs configured to provide information associated with communication latencies.

FIG. 8 is a screenshot associated with a network conference that includes a GUI configured to provide an image as displayed by other endpoints in the network conference, in accordance with an embodiment.

DETAILED DESCRIPTION

Various embodiments of the invention may be implemented in numerous ways, including as a system, a process, an apparatus, or a series of program instructions on a computer readable medium such as a computer readable storage medium or a computer network where the program instructions are sent over optical or electronic communication links. In general, operations of disclosed processes may be performed in an arbitrary order, unless otherwise provided in the claims.

A detailed description of one or more embodiments is provided below along with accompanying figures. The detailed description is provided in connection with such embodiments, but is not limited to any particular example. The scope is limited only by the claims and numerous alternatives, modifications, and equivalents are encompassed. Numerous specific details are set forth in the following description in order to provide a thorough understanding. These details are provided for the purpose of example and the described techniques may be practiced according to the claims without some or all of these specific details. For the purpose of clarity, technical material that is known in the technical fields related to the embodiments has not been described in detail to avoid unnecessarily obscuring the description.

The embodiments described herein provide methods, graphics user interfaces (GUIs), and systems for providing information associated with communication latencies in a network conference. In some embodiments, as explained in more detail below, communications that have delays in a network conference are identified. Information associated with the communications having the delays are then displayed during the network conference. GUIs configured to provide information associated with communications having the delays also are described.

Figure 1:
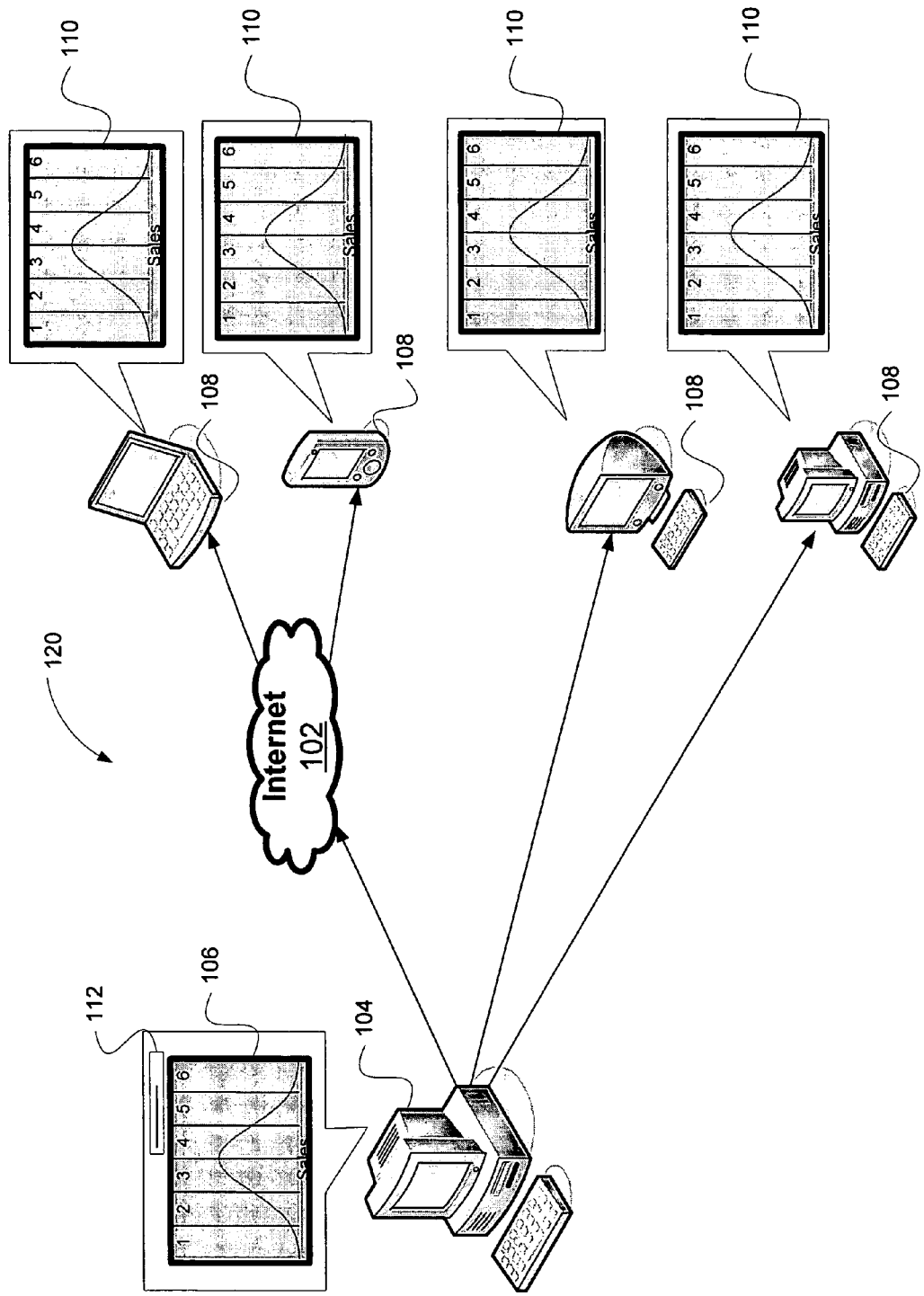
FIG. 1 is a diagram of a network conference system, in accordance with an embodiment.

FIG. 1 is a diagram of a network conference system, in accordance with an embodiment. As shown in FIG. 1, network conferencing system 120 includes endpoint 104 in communication with endpoints 108. Endpoints 104 and 108 may be in communication through a computer network, which can include local area network (LAN) and Internet 102, or through other connections. In a network conference, applications associated with endpoint 104 can share or communicate data with applications associated with endpoints 108. In general, a network conference allows two or more applications associated with endpoints, such as endpoints 104 and 108, to interact and/or collaborate in real-time. An example of a network conference includes video and audio conferencing that allows, for example, an application associated with endpoint 104 to interact with applications associated with endpoints 108 by way of simultaneous two-way video and audio transmissions. For instance, as shown in FIG. 1, an application executed on a computing device associated with endpoint 104 displays image 106 on computing device and transmits image 106 to endpoints 108, which is displayed as images 110. As explained in more detail below, in some embodiments, graphics user interface 112 that provides information that correspond to communication delays may also be displayed along with image 106. The applications executed on computing devices associated with endpoints 108 receive image 106 from endpoint 104 and displays images 110, which may be identical to image 106. It should be noted that other network conferences can include multiplayer game sharing, application sharing, whiteboard conferencing, file transfers, and other network conferences.

Figure 2:
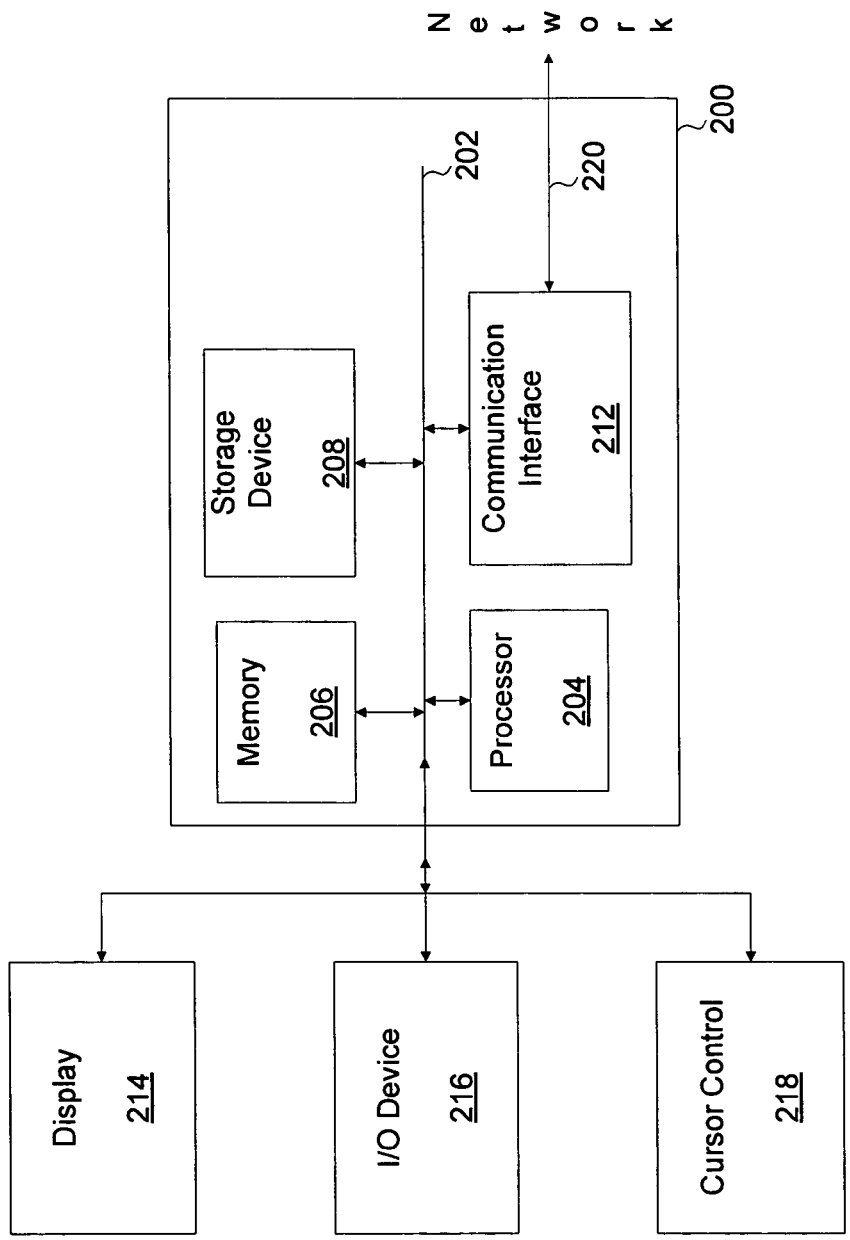
FIG. 2 is a simplified block diagram of an exemplary computer system associated with an endpoint that is suitable for processing and executing a communication latency display application, in accordance with an embodiment.

FIG. 2 is a simplified block diagram of an exemplary computer system associated with an endpoint that is suitable for processing and executing a communication latency display application, in accordance with an embodiment. In some embodiments, computer system 200 may be used to implement computer programs, logic, applications, methods, processes, or other software to provide information associated with communication latency. Exemplary computer system 200 includes a desktop computer, a server, a portable computing device, a personal digital assistant, a computational engine within an appliance, and other computer systems. As shown in FIG. 2, computer system 200 includes bus 202 or other communication mechanism for communicating information, which interconnects subsystems and devices, such as processor 204, system memory 206 (e.g., random access memory (RAM)), storage device 208 (e.g., read only memory (ROM), magnetic disk drives, optical disk drives, and other storage devices), communication interface 212 (e.g., modem or Ethernet card), display 214 (e.g., cathode ray tube (CRT) or liquid crystal display (LCD)), input/output device 216 (e.g., keyboard), and cursor control 218 (e.g., mouse or trackball).

In some embodiments, computer system 200 performs specific operations by processor 204 when executing one or more sequences of one or more program instructions stored in system memory 206. Such program instructions may be read into system memory 206 from another computer readable medium, such as storage device 208. In some embodiments, hard-wired circuitry may be used in place of or in combination with software program instructions to implement embodiments of the invention.

It should be appreciated that the term "computer readable medium" refers to suitable medium that participates in providing program instructions to processor 204 for execution. Such a medium may take many forms, including but not limited to, non-volatile media, volatile media, and transmission media. Non-volatile media may include, for example, optical or magnetic disks, such as storage device 208. Volatile media may include dynamic memory, such as system memory 206. Transmission media includes coaxial cables, copper wire, and fiber optics, including wires that comprise bus 202. Transmission media can also take the form of acoustic or light waves, such as those generated during radio wave and infrared data communications. Common forms of computer readable media includes, for example, magnetic mediums (e.g., floppy disk, flexible disk, hard disk, magnetic tape, and other magnetic mediums), optical mediums (e.g., compact disc read-only memory (CD-ROM) and other optical mediums), physical medium with patterns (e.g., punch cards, paper tape, any other physical mediums), memory chips or cartridges, carrier waves, (e.g., RAM, programmable read-only memory (PROM), erasable programmable read-only memory (EPROM), flash memory, and other memory chips or cartridges), and any other medium from which a computer can read.

In some embodiments, execution of the sequences of program instructions to practice the embodiments may be performed by a single computer system 200. In other embodiments, two or more computer systems, such as computer system 200, coupled by communication link 220 (e.g., local area network (LAN), public switched telephone network (PSTN), wireless network, and other communication links) may perform the sequence of program instructions to practice the embodiments in coordination with one another. In addition, computer system 200 may transmit and receive messages, data, and instructions, including program, i.e., application code, through communication link 220 and communication interface 212. Received program instructions may be executed by processor 204 as the program instructions are received, and/or stored in storage device 208, or other non-volatile storage for later execution.

Figure 3:
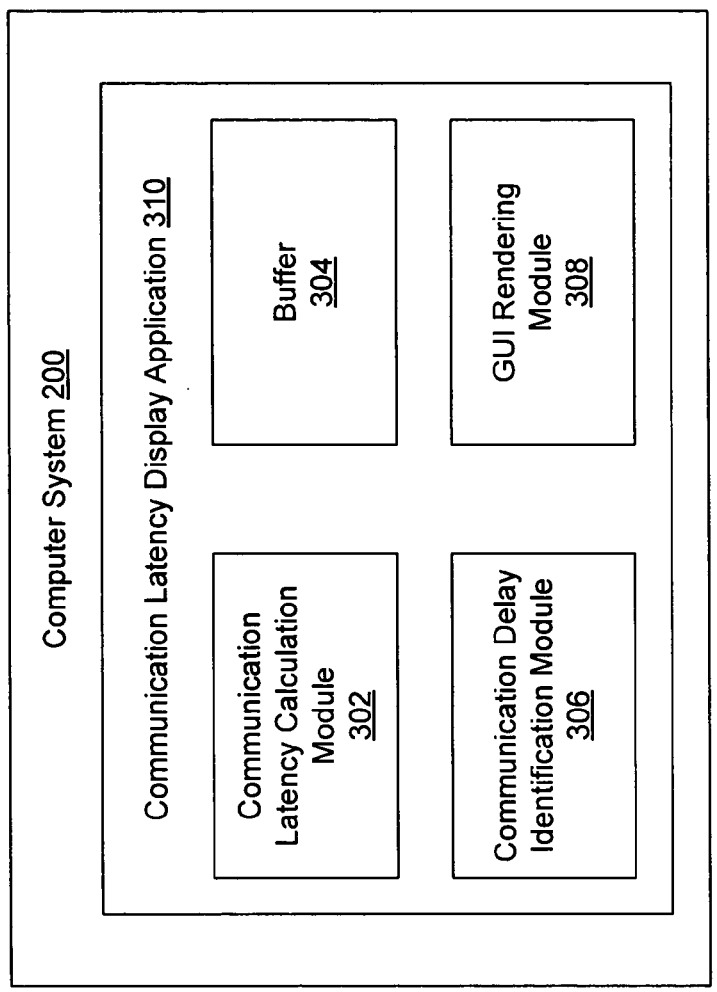
FIG. 3 is a simplified block diagram of an exemplary system for providing information associated with communication latencies, in accordance with an embodiment.

FIG. 3 is a simplified block diagram of an exemplary system for providing information associated with communication latencies, in accordance with an embodiment. As shown in FIG. 3, communication latency display application 310 may be hosted on computer system 200. In the embodiment of FIG. 3, communication latency display application 310 includes communication latency calculation module 302, communication delay identification module 306, buffer 304, and GUI rendering module 308.

Communication latency calculation module 302 is configured to calculate the communication latencies in communications between endpoints. Communication latency may be the time a data takes to travel from an endpoint to another endpoint. For example, communication latency in a packet-switched network can be the time from a source endpoint sending a packet of data to another destination endpoint receiving the packet. Communication latency in a packet-switched network can also be the time from the source endpoint sending a packet to the source endpoint receiving a response. It should be appreciated that communication latency can be calculated by a variety of communication latency calculation techniques. For example, timestamps can be embedded in each packet transmitted to an endpoint. After the packet is transmitted, communication latency calculation module 302 may request a response from the endpoint with the timestamp. When a response is received, communication latency calculation module 302 can calculate the communication latency based on a difference between the time that the packet was sent (e.g., timestamp from response) and the time that the response was received.

Communication system 200 may also include communication delay identification module 306. Communication delay identification module 306 is configured to identify whether there is a delay in communications based on the communication latencies calculated by communication latency calculation module 302. As explained in more detail below, communications may be delayed if the communication latencies are greater than a time limit, in accordance with an embodiment. Buffer 304 is a region of memory used to temporarily store previously transmitted data. Further included is GUI rendering module 308 that is configured to display or provide information associated with communication latencies, which will be explained in more detail below. It should be appreciated that in other embodiments, communication latency display application 310 may include fewer or more modules apart from those shown in FIG. 3. For example, in another embodiment, communication latency display application 310 can include communication delay identification module 306 and GUI rendering module 308, but not buffer 304 and communication latency calculation module 302.

Figure 4:
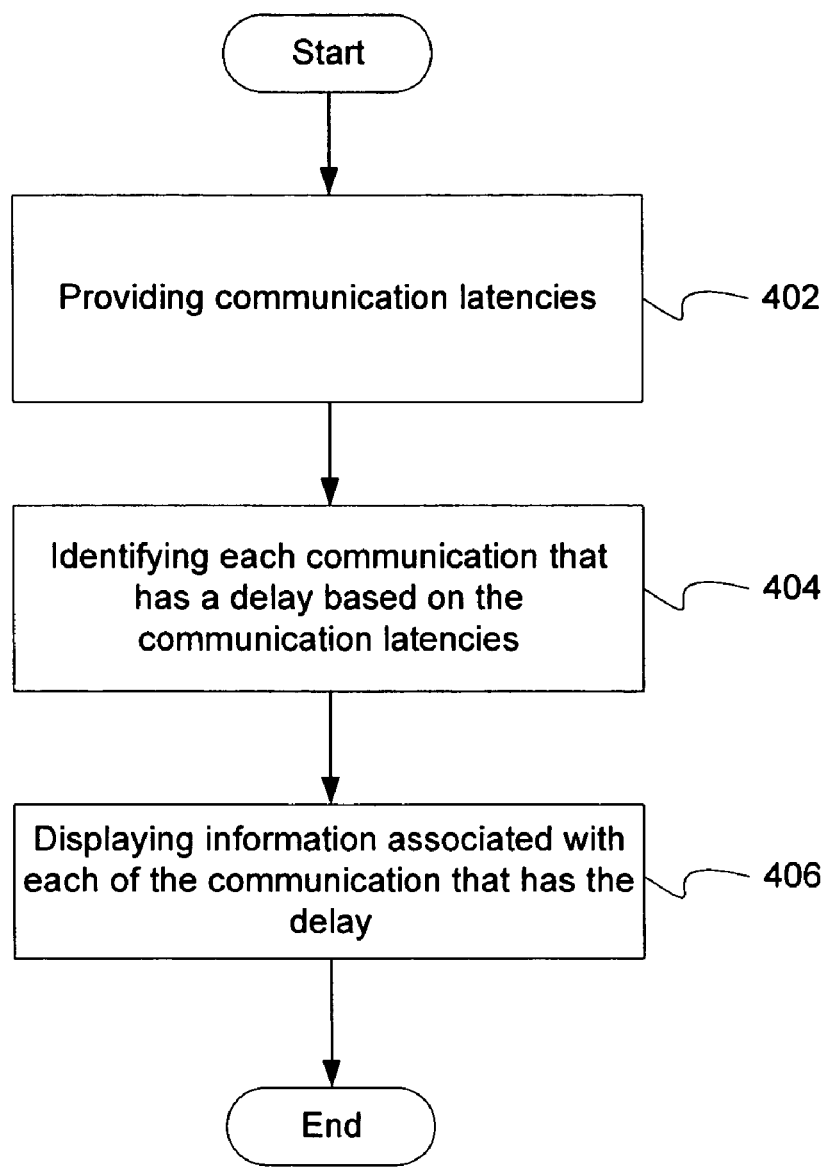
FIG. 4 is a flowchart diagram of a general overview for providing information associated with communication latencies, in accordance with an embodiment.

FIG. 4 is a flowchart diagram of a general overview for providing information associated with communication latencies, in accordance with an embodiment. Starting with operation 402, communication latencies associated with communications to endpoints in a network conference are provided. In an embodiment, as described above, the communication latency display application can calculate the communication latencies. In another embodiment, the communication latencies may be calculated by other applications and provided to the communication latency display application.

After the communication latencies are provided, each communication that has a delay is identified in operation 404 based on the communication latencies. In other words, a determination is made as to whether the communications are delayed based on the communication latencies. In contrast to a communication latency, a delay in communication can be associated with a destination endpoint not updating or receiving data at the same rate as the source endpoint is transmitting data. A delay in communication can also correspond to a destination endpoint not receiving or responding to data transmissions from a source endpoint within a time limit, thereby not allowing endpoints to interact and/or collaborate in real-time during a network conference. Accordingly, in some embodiments, a delay in communication can be defined as communications with communication latencies that are greater than a time limit. In one example, a time delay may range from about one second to about eight seconds. As used herein, the term "about" means that the specified dimension or parameter may be varied within an acceptable tolerance for a given application. In some embodiments, the acceptable tolerance is ±10%. Furthermore, as used herein, it should be noted that the terms "delay" and "communication delay" may be used interchangeably.

As a result, in some embodiments, a comparison can be made between the communication latencies and the time limit. For instance, if a communication latency is greater than the time limit, then the communication associated with the communication latency is identified to have a delay. On the other hand, if the communication latency is lesser than the time limit, then the communication associated with the communication latency is identified not to have a delay.

Still referring to FIG. 4, in an embodiment, information associated with communications that have delays are displayed or provided in operation 406. In some embodiments, the information may be displayed or provided during a network conference. As explained in more detail below, in an embodiment, the information can correspond to the endpoint associated with the communication that has the delay. In another embodiment, the information can include the communication latency associated with the communication that has the delay.

Figure 5:
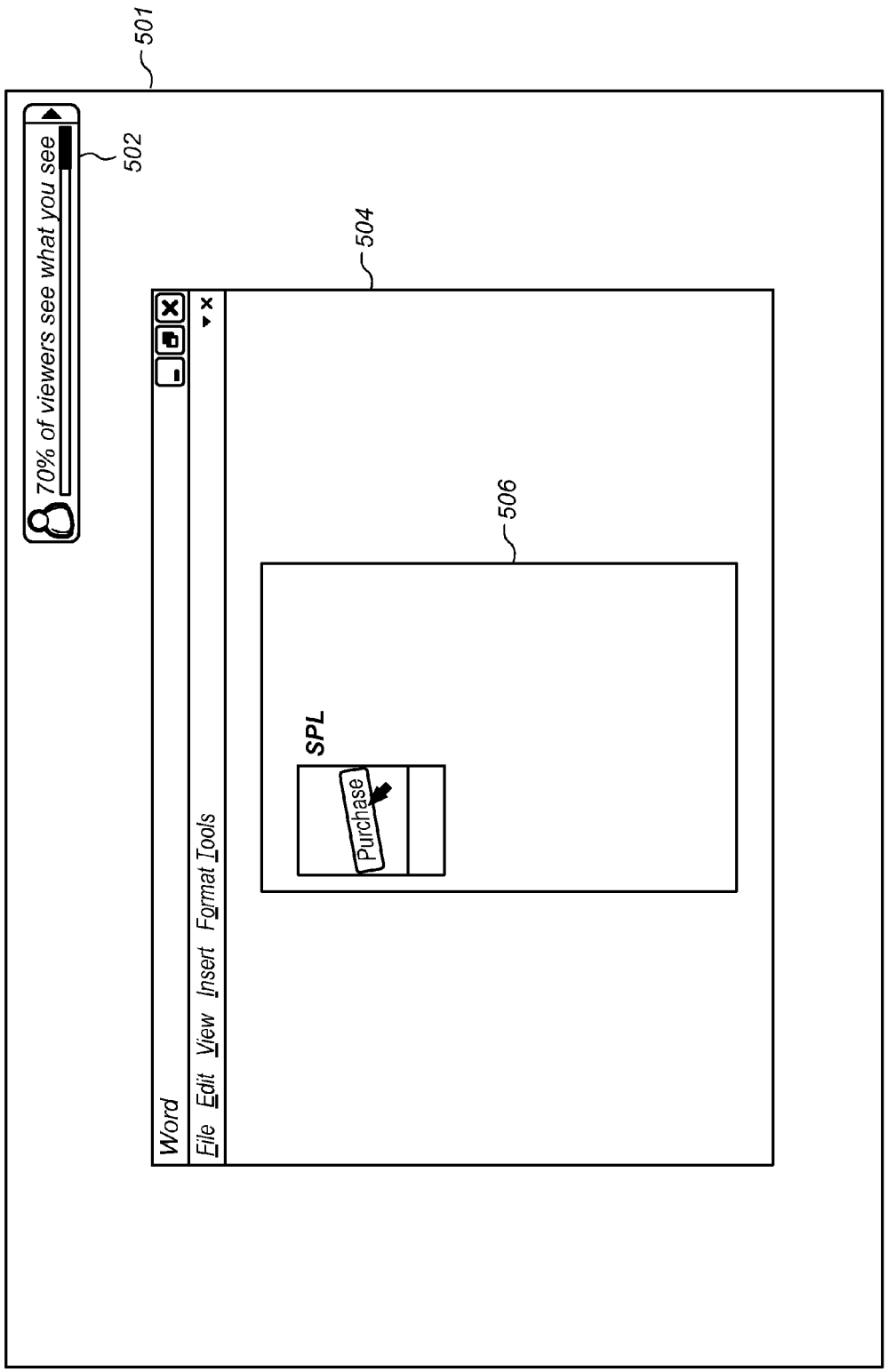
FIG. 5 is a screenshot associated with a network conference that includes a graphics user interface (GUI) configured to provide information associated with communication latencies, in accordance with an embodiment.

FIG. 5 is a screenshot associated with a network conference that includes a GUI configured to provide information associated with communication latencies, in accordance with an embodiment. As shown in screenshot 501 of FIG. 5, electronic document 506 associated with word processing application 504 is being shared with multiple endpoints in a network conference. Accordingly, the computing device transmits an image of electronic document 506 to multiple endpoints in the network conference and the computing devices at the multiple endpoints receive and display the image of the electronic document. Located at the top, right corner of screenshot 501 is GUI 502 that is configured to provide information associated with communication latencies. With GUI 502, a participant in the network conference can see whether there are delays in communications with the other participants. Information provided in GUI 502 can include a variety of information configured to convey communication latencies. For example, as explained in more detail below, the information can include a ratio between endpoints that have communication delays and a total number of endpoints in the network conference.

Figure 6A:
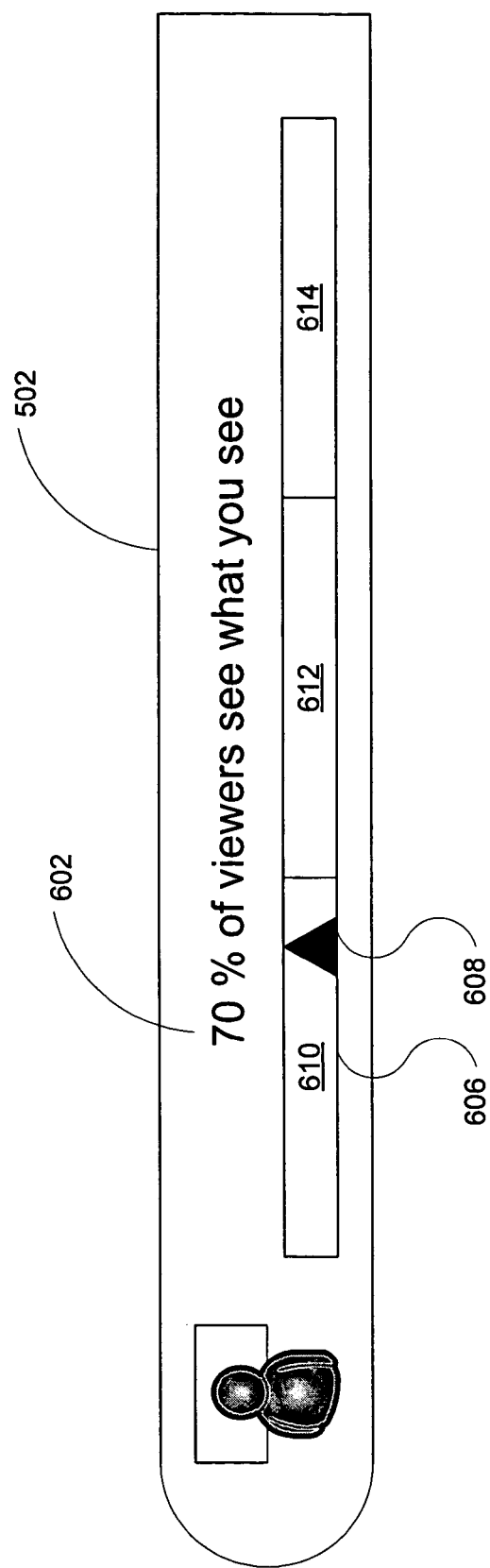
Figure 6B:
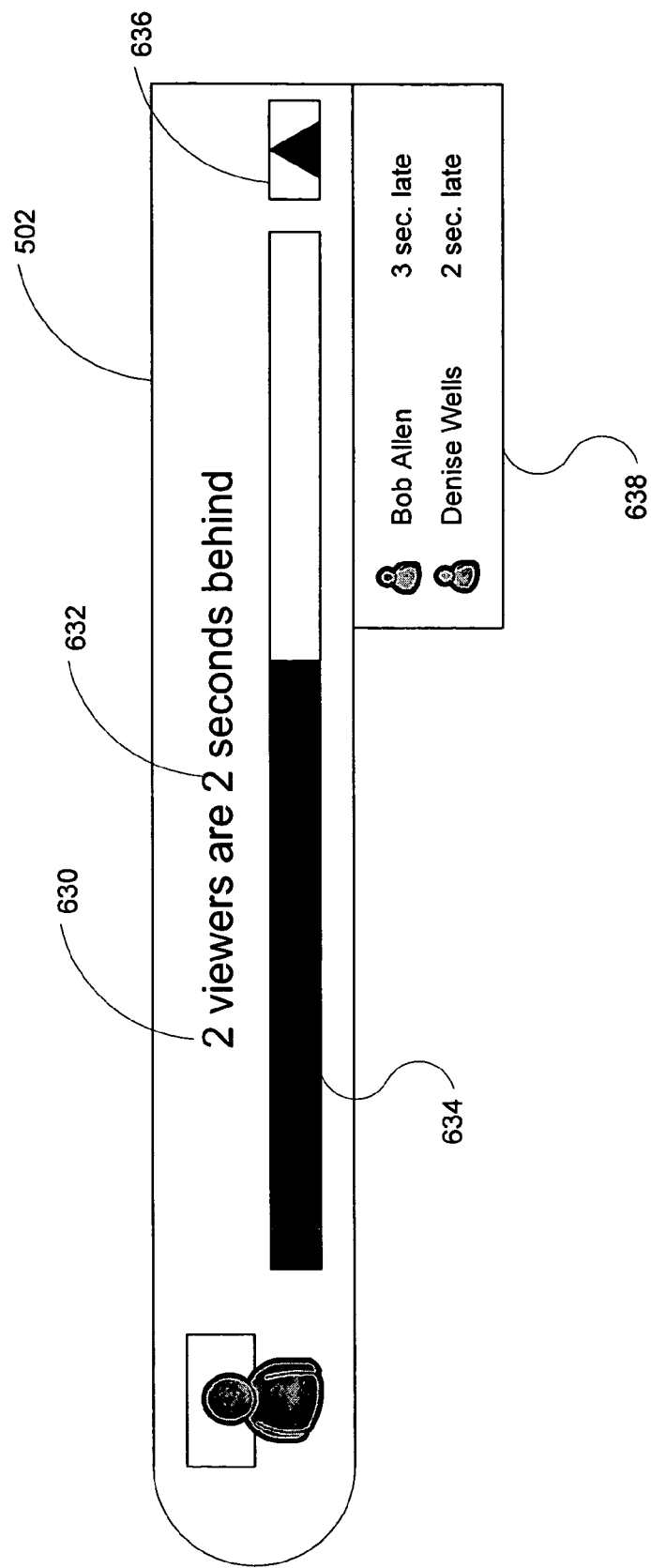

FIGS. 6A-6C are various embodiments of GUIs configured to provide information associated with communication latencies. As shown in FIG. 6A, GUI 502 can include first region 602 and second region 606. First region 602 provides a ratio between endpoints that have delays in communication and a total number of endpoints in the network conference. In the embodiment of FIG. 6A, the ratio is a percentage value of the endpoints without communication delays. In another embodiment, the ratio may be a percentage value of the endpoints that have communication delays.

GUI 502 additionally includes second region 606 that provides a bar chart (i.e., progress bar). In this embodiment, the bar chart is a chart with triangular marker 608 placed at a location within second region 606 that is proportional to the number of endpoints that have or do not have communication delays. Here, the number of endpoints having communication delays increases from left to right. Conversely, the number of endpoints having communication delays decreases from right to left. Accordingly, triangular marker 608 placed closer to the left of second region 606 indicates more endpoints without communication delays. On the other hand, triangular marker 608 placed closer to the right of second region 606 indicates less endpoints without communication delays. Second region 606 may include colors that correspond to whether there is a communication delay. For example, region 614 associated with second region 606 may have a red color to indicate a large number of endpoints with communication delays. Region 612 associated with second region 606 may have a yellow color to indicate a medium number of endpoints with communication delays. Region 610 associated with second region 606 may have a green color to indicate a minimum number of endpoints with communication delays.

In the embodiment shown in FIG. 6B, GUI 502 can include first region 630, second region 632, third region 634, fourth region 636, and fifth region 638. As shown in FIG. 6B, first region 630 provides the endpoints that have communication delays by defining a sum of the endpoints that have the communication delays. Second region 632 defines the communication latency associated with the endpoints that have the communication delays. GUI 502 additionally includes third region 634 that provides a bar chart with rectangular bars of lengths that are proportional to the number of endpoints that have or do not have communication delays. In other words, the lengths of the rectangular bars correspond to a ratio between the endpoints that have communication delays and a total number of endpoints in a network conference.

In some embodiments, to reveal more details regarding the endpoints, a participant may click or select fourth region 636 that provides access to identifiers associated with the endpoints that have the communication delays. As a result, in some embodiments, fifth region 638 pops-up or is displayed when fourth region 636 is selected. However, it should be noted that other regions, such as third region 634, may be selected to display fifth region 638. As shown in FIG. 6B, fifth region 638 may display a list of identifiers (e.g., names, Internet Protocol address, and other identifiers) associated with the endpoints that have the communication delays. Fifth region 638 may additionally list the communication latencies next to the identifiers. A variety of other information may additionally be included in fifth region 638.

With the display of fifth region 638, a participant may further select the identifiers to initiate or access other processes. For example, the participant may select an identifier to initiate a communication session (e.g., chat window or instant messaging) with another participant associated with the identifier. The participant may also select more than one identifier to initiate communication sessions with other participants associated with the identifiers.

In the embodiment shown in FIG. 6C, GUI 502 can include first region 650, second region 656, and third region 654. As shown in FIG. 6C, first region 650 provides a ratio between endpoints that have communication delays and a total number of endpoints in the network conference. Second region 656 provides the communication latency associated with the endpoints that have communication delays. GUI 502 may additionally include third region 654 that provides a pie chart. The pie chart is a circular chart divided into segments where the arc length of each segment is proportional to the number of endpoints that have or do not have communication delays.

Figure 7:
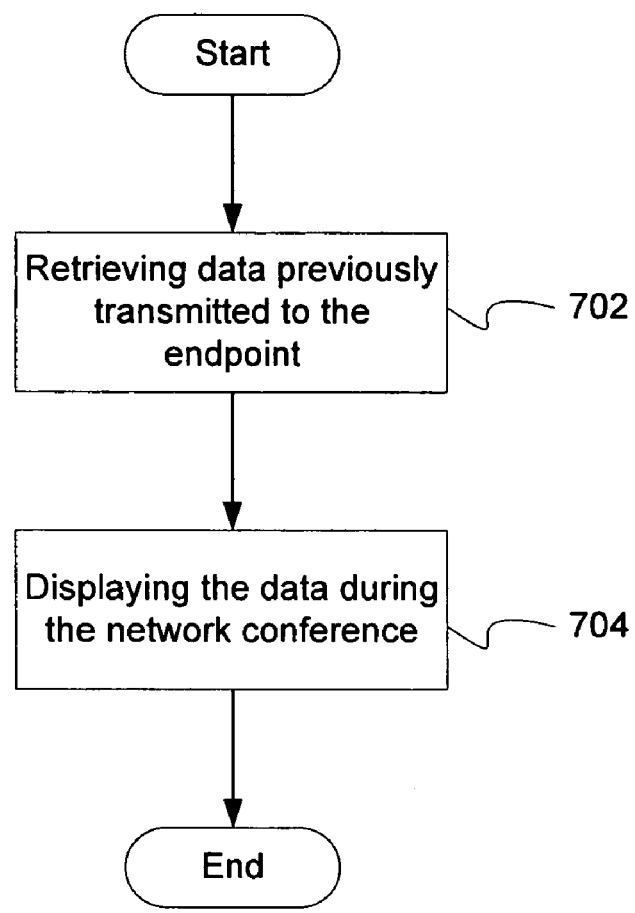
FIG. 7 is a flowchart diagram of a general overview for displaying previously transmitted data at the time of the communication delay, in accordance with an embodiment.

FIG. 7 is a flowchart diagram of a general overview for displaying previously transmitted data at the time of the communication delay, in accordance with an embodiment. The information associated with the communication latencies that are displayed or provided may include data that was previously transmitted to the endpoints at an earlier time, where the earlier time corresponds to the communication latencies. Accordingly, the data received at the endpoints may also be displayed or provided. For example, to assist with a participant to determine whether there is a communication delay, a screenshot as viewed by the other participants in a network conference can be displayed on the participant's computing device. Thus, if the screenshot as viewed by the other participants is not identical to the image viewed by the participant sharing the data, then there is a delay in communication between the participant and the other participants of the network conference.

In a network conference, data transmitted to an endpoint may be stored in a buffer. For example, the data may be stored in buffer 304 shown in FIG. 3 associated with communication latency display application 310. Returning to FIG. 7, in an embodiment, communication latency display application may store the data during transmissions to endpoints or, in another embodiment, another application can handle the storage. During the network conference, the communication latencies are provided to or calculated by the communication latency display application. Communication latency display application then retrieves the data previously transmitted to the endpoints from the buffer in operation 702. The data retrieved is the data previously transmitted at the time associated with the communication latency. For example, as discussed above, timestamps are embedded in packets transmitted to the endpoints during a network conference. Accordingly, the communication latency display application can determine the times the packets were transmitted based on the timestamps and retrieve packets that correspond to the communication latencies. For instance, communication latency display application may be instructed to retrieve data previously transmitted at a time that corresponds to the communication latency. The communication latency display application then reads and matches the timestamp against the time that correspond to the communication latency. When a match is found, the data associated with the timestamp is retrieved.

After the data is retrieved, the data may be displayed during the network conference in operation 704. In some embodiments, the data may be associated with an image. Since the image corresponds to the communication latency, the image displayed can correlate to an image as viewed by other participants in the network conference.

FIG. 8 is a screenshot associated with a network conference that includes a GUI configured to provide an image as displayed by other endpoints in the network conference, in accordance with an embodiment. In screenshot 802, electronic document 806 associated with word processing application 808 is being shared with multiple endpoints in a computer network. Accordingly, an image of electronic document 806 is transmitted to multiple endpoints in a network conference and the computing devices at the multiple endpoints receive and display the image of electronic document 806. Located at the top, right corner of screenshot 802 is GUI 804 with a region that is configured to display an image as displayed at the other endpoints or viewed by other participants in the network conference. As shown in FIG. 8, image provided in GUI 804 is identical to image of electronic document 806 displayed in screenshot 802. Accordingly, there is no delay in communication. On the other hand, if image provided in GUI 804 is not identical to image of electronic document 806 displayed in screenshot 802, then there is a delay in communication between the participant and the other participants in the network conference.

It should be appreciated that a variety of suitable layouts can be designed for region layouts illustrated above as FIGS. 5, 6A-6C, and 8 do not represent all possible layout options available. The displayable appearance of the regions can be defined by a variety suitable geometric shapes (e.g., rectangle, square, circle, triangle, and other shapes), alphanumeric characters (e.g., A, v, t, Q, 1, 9, 10, and other characters), symbols (e.g., $, *, @, ▼, □, ¤, ♥, and other symbols), shadings, patterns (e.g., solid, hatch, stripes, dots, and other patterns), and colors. Furthermore, for example, fourth region 636 shown in FIG. 6B, or other regions, may be omitted or dynamically assigned. It should also be noted that the regions can be fixed or customizable. In addition, the computing devices displaying the GUIs may have a fixed set of layouts, utilize a defined protocol or language to define a layout, or an external structure can be reported to the computing device that defines a layout. Further, clicking on a region of GUI as discussed above triggers code to cause the functionality described herein.

The above described embodiments provide methods, GUIs, and systems for providing information associated with communication latencies in a network conference. The GUIs described above provide a consolidated and simple view of communication latencies during the network conference. Furthermore, the information provided by the GUIs allow a presenter to quickly identify any participants with communication delays. Accordingly, for example, a presenter can pace the presentation according to the percentage of participants that are viewing the presentation in real-time or percentage of participants with communication delays. By pacing the presentation according to the information provided in the GUIs during the network conference, the presenter can minimize or avoid interruptions from other participants complaining about presentation or sharing incongruence.

Although the foregoing examples have been described in some detail for purposes of clarity of understanding, the embodiments are not limited to the details provided. There are many alternative ways of implementing the embodiments. The disclosed examples are illustrative and not restrictive.

What is claimed is:

1. A method, comprising:
 performing by a network application executing on a computer:
  providing data for sending to a plurality of network endpoints, the data comprising content for sharing in a network conference;
  calculating communication latencies between the network application and each respective one of the plurality of network endpoints;
  determining a subset of the plurality of network endpoints that are experiencing a delay in presenting the content based on the communication latencies and a time limit, wherein a ratio of the subset of the plurality of network endpoints to the plurality of network endpoints are experiencing the delay; and
  displaying information indicating the subset of the plurality of network endpoints that are experiencing the delay.

2. The method of claim 1, wherein said determining comprises comparing the communication latencies with the time limit.

3. The method of claim 1, wherein the information identifies the subset of the plurality of network endpoints that are experiencing the delay.

4. The method of claim 1, wherein the information comprises an indication of the ratio.

5. The method of claim 1, wherein the information comprises information representing the communication latencies of the subset of the plurality of network endpoints that are experiencing the delay.

6. The method of claim 1, further comprising:
retrieving data previously transmitted to the plurality of network endpoints; and
displaying the previously transmitted data in the network application.

7. The method of claim 6, wherein the previously transmitted data comprises data representing an image displayed at the plurality of network endpoints.

8. The method of claim 6, wherein the previously transmitted data was transmitted to the plurality of network endpoints at an earlier time, the earlier time corresponding to at least one of the communication latencies.

9. The method of claim 1, wherein said displaying information comprises displaying the information in a graphical user interface (GUI), comprising:
a first region configured to display the ratio, the first region being displayed during the network conference.

10. The method of claim 9, wherein the GUI further comprises a second region configured to display a communication latency associated with each one of the subset of the plurality of network endpoints.

11. The method of claim 9, wherein the GUI further comprises a third region configured to display data received at the plurality of network endpoints.

12. The method of claim 11, wherein the data comprises data representing an image displayed at the plurality of network endpoints.

13. The method of claim 9, wherein the first region comprises a bar chart.

14. The method of claim 9, wherein the first region comprises a pie chart.

15. The method of claim 9, wherein the first region displays a percentage value.

16. The method of claim 9, wherein the GUI further comprises a fourth region configured to display an identifier for each one of the subset of the plurality of network endpoints that is experiencing the delay.

17. A non-transitory computer readable storage medium storing program instructions computer executable to implement:
a network application performing:
providing data for sending to a plurality of network endpoints, the data comprising content for sharing in a network conference;
calculating communication latencies between the network application and each respective one of the plurality of network endpoints;
determining a subset of the plurality of network endpoints that are experiencing a delay in presenting the content based on the communication latencies and a time limit, wherein a ratio of the subset of the plurality of network endpoints to the plurality of network endpoints are experiencing the delay; and
displaying information indicating the subset of the plurality of network endpoints that are experiencing the delay.

18. The non-transitory computer readable storage medium of claim 17, wherein said determining comprises comparing each of the communication latencies with the time limit.

19. The non-transitory computer readable storage medium of claim 17, wherein the program instructions are further computer executable to implement displaying an identifier of each of the subset of the plurality of network endpoints that is experiencing the delay during the network conference.

20. The non-transitory computer readable storage medium of claim 17, wherein the program instructions are further computer executable to implement displaying data indicating the communication latencies associated with each of the subset of the plurality of network endpoints that is experiencing the delay.

21. The non-transitory computer readable storage medium of claim 17, wherein the program instructions are further computer executable to implement displaying the ratio.

22. The non-transitory computer readable storage medium of claim 21, wherein said ratio is displayed as a percentage value.

23. A system, comprising:
a memory storing program instructions executable to implement a communication latency display application; and
a processor in communication with the memory, the processor being configured to execute the program instructions during a network conference;
wherein the communication latency display application is configured to:
provide data for sending to a plurality of network endpoints, the data comprising content for sharing in the network conference;
calculate communication latencies between the network application and each respective one of the plurality of network endpoints
determine a subset of the plurality of network endpoints that are experiencing a delay in presenting the content based on the communication latencies and a time limit, wherein a ratio of the subset of the plurality of network endpoints to the plurality of network endpoints are experiencing the delay; and
display information indicating the subset of the plurality of network endpoints that are experiencing the delay.

24. The system of claim 23, wherein the memory is further configured to store data previously transmitted to the plurality of network endpoints, and wherein the communication latency display application is further configured to:
identify a particular one of the subset of the plurality of network endpoints experiencing the delay in presenting content;
based on a respective communication latency for the particular network endpoint, determine data most recently transmitted to the particular network endpoint that has been received by the particular network endpoint;
retrieve the determined data, and
display the determined data.

* * * * *